United States Patent
Olland

[15] 3,662,675
[45] May 16, 1972

[54] FILTERING DEVICE FOR PREPARING DRINKS

[72] Inventor: Frederik Walraven Olland, Bilthoven, Netherlands

[73] Assignee: Olland Industrie-en Handelmaatschappij N. V., De Bilt, Netherlands

[22] Filed: July 3, 1969

[21] Appl. No.: 838,909

[30] Foreign Application Priority Data

Dec. 23, 1968 Netherlands..........................6818569

[52] U.S. Cl. ............................................................99/289
[51] Int. Cl. ..................................................................A23f
[58] Field of Search ................99/290, 298, 297, 289, 289 T, 99/302 P, 282

[56] References Cited

UNITED STATES PATENTS

| 3,095,800 | 7/1963 | Gilbert | 99/289 |
| 3,203,340 | 8/1965 | Totten | 99/302 X |
| 3,292,526 | 12/1966 | Heier | 99/289 |
| 3,354,811 | 11/1967 | King | 99/282 |

Primary Examiner—Jordan Franklin
Assistant Examiner—George H. Krizmanich
Attorney—Marshall & Yeasting

[57] ABSTRACT

A chamber has an open bottom that is adapted to rest on a sheet of filter paper, and has an aperture for the introduction of solids together with liquid for extracting soluble material therefrom. A piston is reciprocated between a position above such aperture and a position below the aperture where the piston has a sealing engagement with the interior of the chamber. Hold-down apparatus for the chamber is synchronized with the mechanism for reciprocating the piston and operates during the downward stroke of the piston to press the chamber downward against the filter paper, and also operates to free the chamber for upward movement by friction between the chamber and the piston during upward movement of the piston. A stop limits the upward movement of the chamber.

10 Claims, 2 Drawing Figures

FILTERING DEVICE FOR PREPARING DRINKS

BACKGROUND OF THE INVENTION

In preparing hot drinks, particularly coffee, use has been made of ingredients which are soluble in water, and vending machines for dispensing coffee have therefore been provided with a mixing bowl for the ingredients. It has been found that an improvement in the taste of coffee can be obtained by using ground coffee, and for this purpose vending machines have been provided with filtering devices for preparing such drinks.

It is known to pass under a chamber a web of filter material having a series of caps also of filter material covering a quantity of ground coffee. The caps on the web are placed under the open end of the chamber after which hot water streams into the chamber and is then pressed through the filter material and the grains of coffee by means of a piston. After the water has passed through the filter material, the chamber is lifted by a small amount and the web of filter material is displaced until the next cap is positioned under the open end of the chamber. The used part of the web of filter material with the used cap is delivered to a container provided for the purpose.

The provision of a supply opening for the ingredients to the chamber enables the web of filter material to be wound on a supply roll, and the web without ingredients can be displaced under the chamber. The ingredients are supplied through the supply opening below the piston into the pressure space of the chamber, the ingredients being poured on the filter material after the open end of the chamber engages the filter material to close the chamber.

SUMMARY OF THE INVENTION

The object of the invention is to provide an improved filtering device which can be used in vending machines, and according to the invention such a filtering device is characterized in that the chamber has a guide space for the piston positioned above a supply opening for the ingredients to be filtered, a pressure space being formed between the supply opening for the ingredients and the edge of the chamber which contacts the web of filter material, in which pressure space the piston is slidable and seals the pressure space of the chamber.

An even distribution of the ingredients on the filter material can be obtained by adapting a filtering device according to the invention in such a manner that the chamber is connected to a pouring cup by means of the supply opening, the pouring cup being placed under delivery inlets for the ingredients and for measured quantities of liquid. When the water and ingredients are simultaneously poured into the pouring cup, the ingredients will be suspended and will be spread on the filter material under the chamber. The infusion or extraction thus begins before the piston performs its pressure stroke. It is possible to keep the chamber unencumbered by driving means for the piston, as a result of which the ingredients in the chamber can only contact the pressure walls of the filter system and a good distribution of the ingredients in the chamber is possible. Also a guide for the piston may be formed by a wall of the chamber, this wall extending above the supply opening and having two opposed and parallel notches; the notches extend parallel to the stroke of the piston and a piston pin passes through the notches, piston rods being fastened to the piston pin and extending outside the chamber to a driving mechanism disposed below the chamber. A further practical embodiment of a filtering device according to the invention is characterized in that push rods for the chamber run parallel to the piston, the push rods being coupled to the driving mechanism and being controlled in such a manner that the chamber is pressed against the filter material on a support when the piston performs a pressure stroke.

BRIEF DESCRIPTION OF THE DRAWINGS

The invention will now be further described with reference to the accompanying drawings which show, by way of example, a filtering device in accordance with the invention for use in a vending machine which dispenses drinks. In the drawings.

Figure 1:
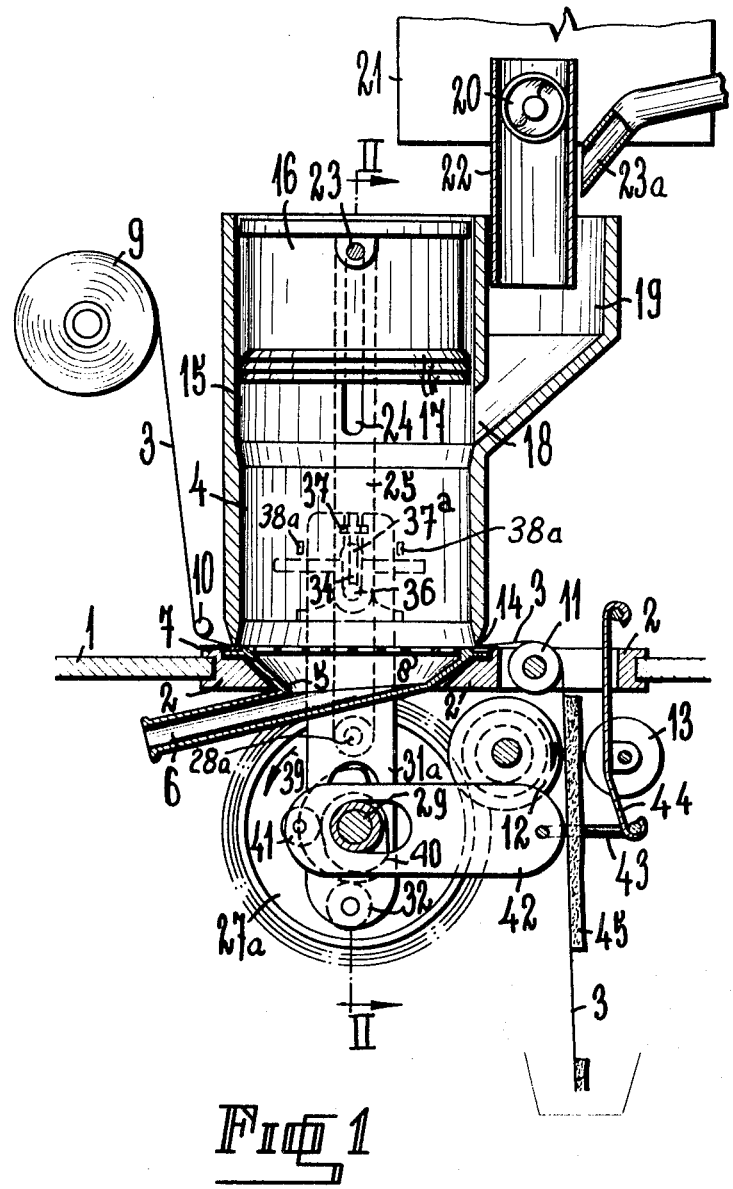
FIG. 1 is a sectional view on a vertical plane through the filtering device.

A support 2 for filter material 3 and a chamber 4 are positioned in a partition or wall 1 of the vending machine. A funnel 5 provided with a drain outlet 6 is mounted in the support 2 and the upper rim of the funnel is provided with a sealing ring 7, preferably of a resilient material. A grating 8 of strong material is also supported by the upper rim of the funnel 5. A web of filter material 3 runs over the support 2, the ring 7 and the grating 8, the web being drawn from a supply roll 9 positioned in the case of the vending machine. The web of filter material 3 runs over guide rollers 10 and 11, and by means of a drive roller 12 cooperating with a pressure roller 13 the web of filter material can be displaced. The rim 14 of the lower open end of the chamber 4 presses firmly on the filter material and on the elastic ring 7 beneath it, providing a good seal for the chamber and the filter material.

A guide bore 15 for the piston 16 is provided above the chamber 4. The guide bore 15 for the piston is formed by an upward extension of the wall of the chamber 4 and the effective cross-sectional area of the guide bore 15 is larger than the cross-sectional area of the chamber 4. The piston 16 is provided with resilient sealing rings 17 and is a close fit in the chamber 4. The upper position of the piston 16 is shown in FIG. 1, a supply opening 18 for the ingredients to be filtered and to be extracted being positioned below the piston 16 and above the chamber 4. The supply opening 18 forms a passage between the chamber 4 and a hopper 19. The hopper 19 is open at its upper end and is positioned under a delivery device for a measured quantity of ingredients to be extracted. The delivery device 20 is supplied by a container 21 for the ingredients. In order to prevent the ingredients from spreading out too much when they leave the delivery device 20, a tube 22 is provided and hot water is delivered from a spout 23a after opening a valve. As a result, water flows around the tube 22 and the ingredients immediately come into contact with the water that flows around the tube 22 into the tube hopper 19. The ingredients (such as milled coffee) mix intimately with the water and the mixture flows from the hopper 19 through the opening 18 into the chamber 4, providing a good distribution of the ingredients on the filter material 3 in the chamber.

The admittance of the measured quantity of hot water out of the spout 23a and the operation of the delivery device are performed by a separate control device of the vending machine and the operation of this device need not be described as such control devices are generally known and form no part of the present invention. It will be appreciated that a programmed control mechanism is arranged in the vending machine to ensure that the piston 16 performs a pressure stroke after the ingredients have been poured into the hopper 19 and into the chamber 4.

Figure 2:
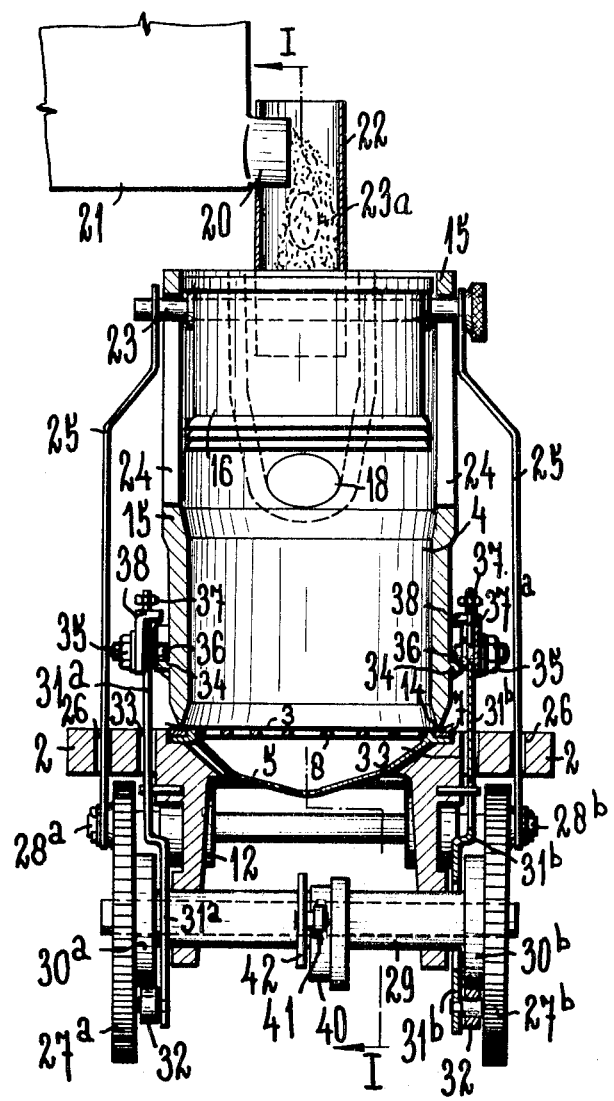
FIG. 2 is a sectional view of the device on the line II—II of FIG. 1.

The piston is provided with a piston pin 23 for driving the piston, which piston pin projects through slots 24 in the wall of the guide bore 15, the piston rods 25 being mounted at both ends of the piston pin 23. Each piston rod runs through a corresponding slot 26 of the support 2. The end of each piston rod is fastened to a crank provided by a gearwheel. There are thus two cranks 28a and 28b which are respectively provided by two gearwheels 27a and 27b, as shown in FIG. 2. It will be evident that when the gearwheels with their cranks rotate, the piston rods 25 move the piston to perform a pressure stroke and a return stroke. The gearwheels are secured to a common shaft 29. At the sides of the gearwheels remote from the cranks, the gearwheels are provided with a cam or control disc and the circumference thereof is engaged by a roller 32 secured to a push rod. There are again two cams and two push rods respectively indicated at 30a, 30b and 31a, 31b in FIG. 2.

The two push rods respectively extend through two slots 33 in the support 2 and are provided with pins 36 which fit in channel supports 34 extending on diametrically opposite sides of the wall of the chamber 4.

The upper side of the supports 34 is open in such a manner that the push rods with the pins 36 can slide out of the supports 34 when the chamber is to be removed, as for cleaning purposes. Each pin 36 is fastened to the corresponding push rod by means of an associated nut 35. A plate 38 (FIG. 2) provided with cams 38a (FIG. 1) is positioned between each nut 35 and the associated push rod. The cams 38a project with clearance above the supports 34 for a purpose which will be described hereinafter. The push rod can be adjusted with respect to the pin 36 by means of a pin 37a and a nut 37, in such a manner that the lower edge 14 of the chamber presses tightly on the filter material 3 and the ring 7.

The shape of the cams 30a, 30b is indicated in FIG. 1 and the cams are positioned in phase quadrature with respect to the cranks 28a, 28b. The crown of each cam extends for more than 180°. When the cranks are in their uppermost positions, as indicated in FIGS. 1 and 2 and the gearwheels rotate in the direction according to the arrow 39, the piston will perform a pressure stroke. The edge 14 of the chamber 4 is tightly engaged with the filter material because the rollers 32 are on the crown of the cams before the cranks reach their uppermost positions as indicated in FIG. 1. When the gearwheels rotate further in the direction of the arrow, the cranks pass their lowermost position and the piston 16 performs its return stroke. Further, the roller 32 runs from the crown of the cam to the foot of the cam. Thus, the chamber 4 is no longer drawn tightly against the filter material 3 and, as a result of the friction between the piston 16 and the wall of the chamber 4, the latter will move with the piston 16 on the return stroke and will be lifted from the filter material 3.

As has been mentioned, the ingredients to be filtered and to be extracted enter the chamber 4 before the piston 16 begins a pressure stroke. The quantities of the ingredients and water in comparison with the volume of the chamber are such that an air bubble is present between the piston and the ingredients. This has the advantage that the ingredients do not contact the operative surface of the piston 16, which further facilitates the lifting of the chamber 4 from the filter material 3. A cam 40 cooperating with a roller 41 and a push rod 42 is positioned on the shaft 29 of the gearwheel 27. The roller 41 contacts the circumferential surface of the cam 40. The push rod 42 is connected to a bracket 43 which surrounds the strip of filter material leaving the roller 11, and the bracket is connected to a plate 44 which supports two rollers 13. When the roller 41 of the push rod 42 engages the crown of the cam 40, the push rod 42 and the bracket 43 draw the rollers 13 against the filter material 3 which is thereby pressed against the drive roller 12. As the drive roller 12 is connected to the gearwheels 27a and 27b, the filter material is conveyed and a new part of the web of filter material coming from the supply roller 9 passes below the chamber 4. A cake 45 of spent ingredients remains on the web of filter material which hangs from the roller 11. The filter material together with the cakes 45 can be deposited in a container provided for this purpose.

The position of the cam 40 with respect to the cranks 28a and 28b and the cams 30a and 30b is such that the filter material is conveyed after the chamber 4 has been lifted from the filter material and during the return stroke of the piston 16. The chamber 4 is tilted by a slight angle during its upwards movement, because the push rods 31a and 32a are guided in such a manner that they perform a straight movement, whereas the piston rods 25 can be moved sideways within the slots 26. The tilting of the chamber 4, however, is limited and for this purpose cams 38a are provided on the plate 38 between the push rod and the nut. When the chamber is to be prevented from further tilting, one of the cams 38a contacts a part of the support 34. During the tilting movement of the chamber the side thereof adjacent the roller 11 is lifted more than the side of the chamber adjacent the roller 10. The spent ingredients can easily pass below the edge 14 of the chamber.

What I claim is:

1. A filtering device for preparing drinks in vending machines, comprising a support having an opening, for supporting a sheet of filter paper covering the opening, a chamber which has an open bottom that is adapted to rest on a sheet of filter paper on the support, an aperture in the chamber for the introduction of solids together with liquid for extracting soluble material therefrom, a piston and mechanism for reciprocating the piston between a position above such aperture and a position below such aperture where the piston has a sealing engagement with the interior of the chamber, wherein the improvement comprises hold-down apparatus for the chamber which is synchronized with the mechanism for reciprocating the piston and which operates during the downward stroke of the piston to press the chamber downward against said filter paper and said support and also operates to free the chamber for upward movement by friction between the chamber and the piston during the upward movement of the piston, said hold-down apparatus being provided with a stop for limiting the upward movement of the chamber.

2. A filtering device according to claim 1 wherein the mechanism for reciprocating the piston comprises a connecting rod and a crankshaft which operate to tilt the chamber during upward movement of the piston.

3. A filtering device according to claim 2 comprising a common drive shaft which is connected to drive both the reciprocating mechanism for the piston and the hold-down apparatus for the chamber, and mechanism which is also driven by such drive shaft, after the chamber has been moved upward by the piston, for removing the spent filter paper and moving a fresh section of filter paper beneath the chamber.

4. A filtering device according to claim 1 comprising a hopper which discharges into the chamber through the aperture, a tube for discharging solids into the hopper, and a spout for discharging a liquid, which is directed against the side of the tube to cause the liquid to flow around the lower end of the tube so as to produce a stream of liquid surrounding a stream of solids flowing from the tube.

5. A filtering device according to claim 1, wherein the chamber has an upward extension forming a guide bore for the piston and has two notches which are parallel and opposed to each other, the notches extending parallel to the direction of movement of the piston, with a piston pin passing through the notches and piston rods fastened to the piston pin and extending outside the said chamber, and a driving mechanism positioned below the chamber and connected to the piston rods.

6. A filtering device according to claim 5, wherein push rods for the chamber run parallel to the piston rods and are connected to the driving mechanism and are operated by the driving mechanism in such a manner that the chamber is drawn against the support for the filter material when the piston performs a pressure stroke, the support being positioned between the chamber and the driving mechanism.

7. A filtering device according to claim 6, wherein the push rods for the chamber are connected to the chamber in such a manner that they can be easily disconnected, the push rods being provided with an adjustable top for adjusting the pressure of the open end of the chamber on the filter material.

8. A filtering device according to claim 6, wherein the driving mechanism is provided with cranks for the piston rods and cams for the push rods for the chamber, the cranks being arranged in phase with the cams, the crowns of which extend over more than 180°.

9. A filtering device according to claim 8, wherein the cams and the cranks are mounted on a common drive shaft, the shaft is provided with one or more gearwheels, a drive roller is provided for driving the filtering material, having gearwheels which intermesh with the gearwheels on the drive shaft, and a pressing roller is provided having a push rod for pressing the pressing roller against the filter material and against the drive roller.

10. A filtering device according to claim 9, wherein a cam for actuating the push rod for the pressing roller cooperating with the drive roller is positioned on the common drive shaft.

* * * * *